United States Patent Office 3,143,174
Patented Aug. 4, 1964

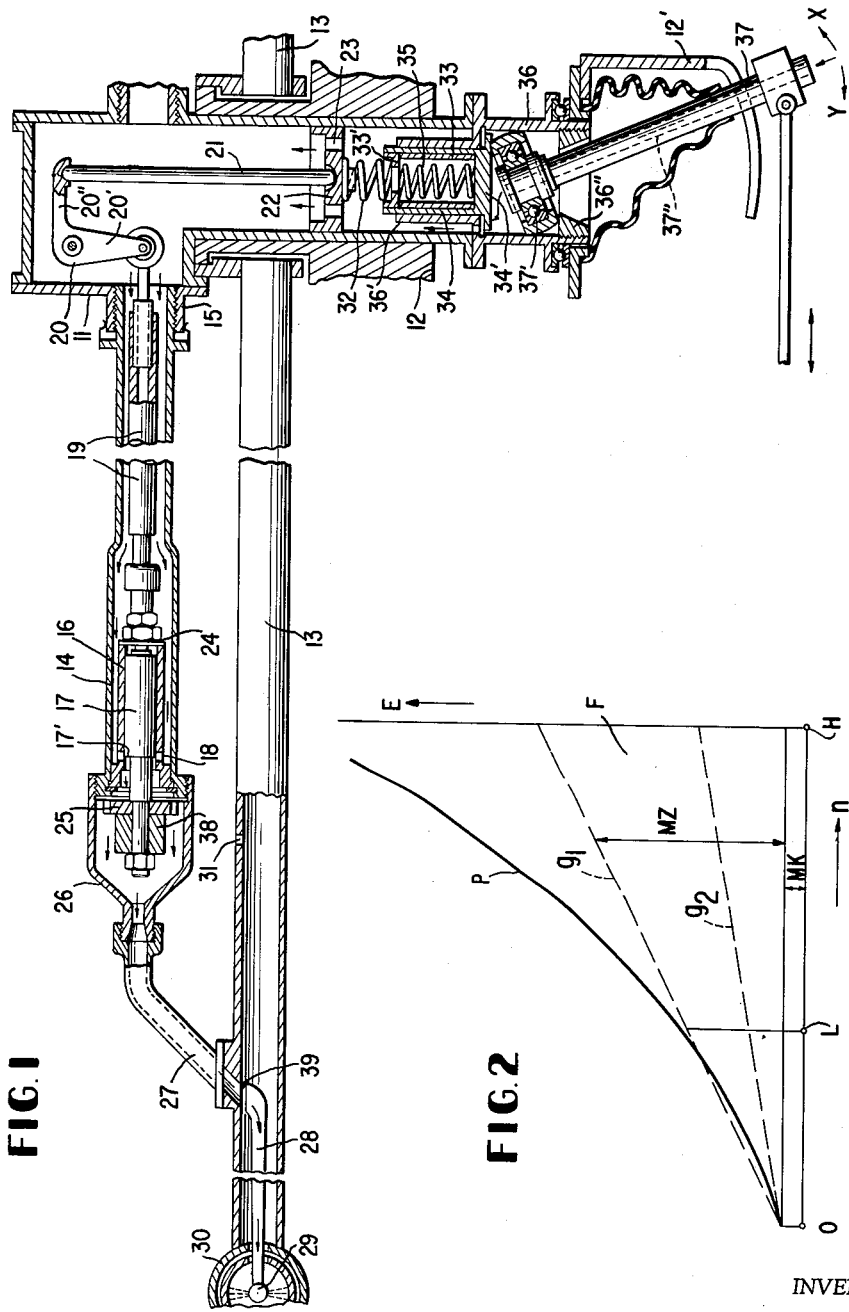

3,143,174
FUEL CONTROL INSTALLATION FOR A ROTATING RAM JET UNIT ON A PROPELLER BLADE
Wilhelm Jurisch, Parksiedlung, Nellingen, Kreis Esslingen, Germany, assignor to Daimler-Benz Aktiengesellschaft, Stuttgart-Unterturkheim, Germany
Filed Oct. 17, 1960, Ser. No. 63,941
Claims priority, application Germany Oct. 31, 1959
16 Claims. (Cl. 170—135.4)

The present invention relates to an installation for controlling and supplying the fuel quantity for rotary ram-jet drive units, especially for those which are arranged at the outer ends of the rotor blades of helicopters, provided with a supply of the fuel to the burners of the drive unit by means of the centrifugal force occurring during operation thereof and with a fuel control installation by means of which a fuel quantity is preselected or premetered corresponding to the prevailing operating condition.

The present invention is characterized by a speed-control means or rotary speed-regulator device completely or partly coordinated to or operatively connected with the rotor, whereby the movable part of the fuel control installation is included in the centrifugal system thereof rotating in unison with the rotor.

Furthermore, the present invention is characterized by a command or signal installation effective as a rotary speed selector installation which, after receiving an initial command, temporarily adjusts the fuel control member to the position of "full load" or "idling" thereof through the speed regulating device for such length of time until the return command or signal coming back from the speed-regulating member in the form of a changed centrifugal force re-establishes the previously disturbed equilibrium condition whereby, following the same, the fuel control piston automatically assumes a position in which the fuel quantity is supplied which corresponds to the output to be produced by the rotor blade, i.e., depending on the angular blade adjustment thereof.

According to the present invention, the path of the fuel up to the burners of the drive unit is subdivided into two supply systems, and more particularly, into a pressure supply system extending up to the fuel metering installation which is closed off against the atmosphere and in which there predominates a centrifugal fuel supply, and into a supply system extending outwardly from behind the fuel metering member up to the burners which is vented with respect to the atmosphere and operates exclusively by means of the centrifugal force.

Furthermore, according to the present invention, a spring element, namely a pre-selecting spring is interposed between the speed selector installation and the rotary speed control means or regulating device the abutment of which is adjustably arranged in relation to the rotary speed control means.

An installation is created by the present invention with simple means and relatively slight constructional expenditures which corresponds to the operating behavior, properly speaking, of the ram-jet drive units by means of which the fuel supply prescribed by aerodynamic and thermodynamic considerations of ram-jet drive units is brought into consonance technically and economically with the behavior of fluids subjected to a centrifugal force; for the mathematical interrelationship is fulfilled with the aid of an installation according to the present invention for both the supplied minimum and maximum injection quantities with a constant control section as well as also for the rate of air flow of the drive units, at least in proximity to the ground and at relatively low heights at which the helicopter has to fly most frequently whereby the two aforementioned factors, i.e., the fuel quantity supplied by the centrifugal force and the rate of air flow, proceed approximately proportionally to the rotational speed.

This is rendered possible in accordance with the present invention by the connection of the part of the fuel supply system disposed behind the fuel metering installation with the free atmosphere so that the fuel quantities injected at the particular time into the drive unit are dependent on the supply output caused by the centrifugal force, in other words, the premetered fuel quantity is subjected to the supply pressure resulting from the centrifugal force.

Accordingly, it is an object of the present invention to provide a fuel supply system, especially for rotary ram-jet engines located along the tips of a helicopter rotor which obviates the inadequacies and shortcomings of the prior art systems.

It is another object of the present invention to provide, with simple means and relatively inexpensive structures, a fuel metering and control system which brings into harmony the fuel supply conditions prescribed by aerodynamic and thermodynamic considerations with the behavior of liquid fuels subjected to centrifugal forces.

Still another object of the present invention is the provision of a fuel metering and supply system for ram-jet drive units, particularly those located at the outer tips of the rotor blades of helicopters, in which the supplied fuel quantities and rate of air flow through the drive units are kept at least approximately proportional to the rotary speed.

A still further object of the present invention resides in the provision of a fuel control system for a fuel supply system which effectively subdivides the fuel supply system into two sections one of which is hermetically sealed against the atmosphere whereas the other is vented with respect thereto to thereby provide an overall performance characteristic producing optimum control for the system.

These and other objects, features and advantages of the present invention will become more obvious from the following description when taken in connection with the accompanying drawing which shows, for purposes of illustration only, one embodiment in accordance with the present invention and wherein FIGURE 1 is a partial cross-sectional view through the rotor of a helicopter and the control installation in accordance with the present invention coordinated thereto, and FIGURE 2 is a diagram representing the characteristics of the injection quantities in relation to the rotor rotational speed.

Referring now to the drawing, and more particularly to FIGURE 1, reference numeral 11 designates therein the rotating rotor housing which is suitably supported, in any conventional manner, in the engine frame 12 or in the airplane cell. The individual rotor blades 13 are secured at the rotating rotor housing 11 in any suitable manner. The fuel supply pipes 14 which are disposed above the blades 13, are secured at the rotor housing 11 by the interposition of a threaded bushing 15 which enables an adjustment of the guide sleeve 16 rigidly connected with the fuel supply pipe 14 in relation to the control piston 17 supported therein so as to be movable in the axial direction thereof. The forward edge 17' of the control piston 17, i.e., the raidally outwardly disposed edge 17' disposed toward the left as viewed in FIGURE 1, controls the fuel metering bore or bores 18 provided within the guide sleeve 16. The control piston 17 is operatively connected by means of a rod 19 with one arm 20' of a bell crank 20 pivotally supported within the rotor housing 11, the other arm 20" of which is pivotally connected with a push-rod 21 the lower end of which abuts against a spring disk 22 provided with fuel supply bores 23.

An abutment disk 24 is provided at the forward end of the connecting rod 19 which abutment disk 24 is adapted to abut against the inner end of the guide sleeve 16 whereby, upon such abutment, the forward control edge 17' of the piston 17 releases the metering bore 18 only to such an extent that the amount of fuel supplied does not drop below the flame-out limit of the combustion chamber of the ram-jet drive unit, i.e., the idling rotary speed thereof. A further abutment disk 25 is provided in front of the control piston 17 which is adapted to abut against a forwardly facing surface of the supply pipe 14 whereby the control edge 17' of the piston 17 releases or opens up fully the metering bore 18 when the disk 25 abuts against this forwardly facing supply pipe surface.

A fuel discharge housing 26 is secured to the forward end of the fuel supply 14 which is adjoined by a supply line 27 leading to the rotor blade 13. A feed line 28 leading to the burners 29 of the ram-jet drive unit 30 extends within the rotor blade 13. A free space 39 is provided intermediate the orifice of the supply line 27 and the inlet aperture of the feed line 28, i.e., both lines are not connected with each other in airtight or hermetically sealed manner. The section between the metering bore 18 and the burners 29 is vented by means of a bore 31 disposed within the rotor blade 13.

A pretensioning spring or rotary speed selector spring 32 pushes against the disk 22 while the other end of spring 32 is supported at the abutment 33' of a bushing 33 which is inserted into an adjusting sleeve 34 provided with a bottom 34'. A closure spring 35 is accommodated within the bushing 33 which, on the one hand, rests against the spring abutment 33' and, on the other, against the bottom 34'.

A shifting housing 36 is secured at the rotor housing 11, the inside height of which is smaller than the inside diameter thereof. The spherically-shaped foot portion of a rotary speed selector member 37 constructed as a rotary or ball bearing 37' is supported within the shifting housing 36. This spherically-shaped foot portion, on the one hand, is supported against a cover 36" of the shifting housing 36 and, on the other, against the bottom 34' of the adjusting sleeve 34 which is adjustably arranged in the axial direction thereof within a guide means 36' rigid with the shifting housing 36. The rotary speed selector lever 37 which is provided with a fuel supply bore 37" is guided within the part 12' of the engine frame or airplane cell.

*Operation*

The operation of the control installation in accordance with the present invention is as follows:

The stop position of the installation is assumed as the initial point for purposes of this discussion in which the rotary speed selector lever 37 is disposed vertically and the bottom 34' of the adjusting sleeve 34 is forced by the pretension of the closure spring 35 against the orifice of the bore 37" whereby the supply of fuel is completely blocked or cut-off.

If the lever 37 is pivoted from the vertical position thereof in the direction of arrow X, then the selector spring 32 is pre-tensioned, the control piston 17 at first moves toward the right as viewed in FIGURE 1 of the drawing and thereby completely relieves or opens up the metering bore 18. The fuel thereby reaches the burners 29 of the drive unit 30, to some slight extent by the pressure produced by the fuel supply pump (not shown), but principally by the centrifugal force of the rotor 13 which had been set into rotation already by a starter motor of any conventional construction (not shown). As a result thereof, the rotor 13 is accelerated and therewith the centrifugal force increases. If the centrifugal force reaches the same magnitude as the preselected pretensioning force of the selector spring 32, then the control edge 17' of the piston 17 commences to reduce the free cross section of the metering bore 18 for such length of time until such a quantity of fuel flows through the still open cross sectional area of the metering bore 18 that the stable condition of the installation, i.e., a constant rotary speed of the rotor with a predetermined angular adjustment of the rotor blades is maintained. The supply of the pre-metered fuel quantity to the injection nozzles of the burner systems takes place exclusively by the centrifugal force which results from the fuel quantity disposed in front of the injection nozzles.

Upon retracting the speed selector lever 37 in the direction of arrow Y, the selector spring 32 at first is correspondingly relieved or untensioned, thereupon the control edge 17' of the piston 17 at first closes the metering bore 18 to the smallest possible cross-sectional flow area corresponding to idling speed whereby the abutment 24 becomes effective. As a result thereof, the rotational speed of the rotor 13 drops for such a length of time until equilibrium prevails between the preselected pretention of the spring 32 and the resulting centrigual force. The control piston 17 thereupon readjusts by a further decrease of the rotational speed on a short-time basis, i.e., it releases the metering bore 18 corresponding to the prevailing blade adjustment of the rotor.

Thus, one completely predetermined rotational speed is coordinated to each position of the rotational speed lever 37 which is maintained, independently of the speed regulating device, by the engine power absorption of the rotor or the blade adjustment thereof. Depending on the engine power absorption of the rotor, a more or less large free cross-sectional area adjusts itself at the metering bore 18.

FIGURE 2 shows in diagramatic form the control characteristics of a system in accordance with the present invention in which the rotor rotational speed $n$ is plotted along the abscissa. The point H indicates the maximum rotary speed thereof. A constant fuel quantity MK is supplied by the pressure in the fuel supply pump. A fuel quantity MZ which increases with rotary speed is the result of the occurring centrifugal force. The full line curve designated by reference character P indicates the centrifugal force curve which increases as the square of the rotary speed $n$. The existing minimum and maximum injection quantities which are determined by the abutments 24 and 25 are indicated by the straight lines $g_1$ and $g_2$. All of the operating conditions and operating points possible by the blade adjustment and speed selection lie within the area F limited by the two straight line $g_1$ and $g_2$.

It is possible by the magnitude of the pressure in the supply pump to match the proportion of the fuel quantity in the idling and full-load range to the drive unit characteristics which, in the usual manner, requires a richer fuel air-ratio in the lower range than in the upper range, i.e., with higher rotational speeds.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. An installation for controlling and effectively supplying fuel quantities for rotating ram-jet units including burners arranged at the outer ends of the rotor blades of helicopters, comprising fuel supply means for supplying fuel to the burners of the drive units by the centrifugal force occurring during operation of the drive unit, a fuel metering and control means arranged in said fuel supply means including a metering bore and a control piston adapted to meter the flow through said bore, said control piston being arranged to rotate in unison with the rotor blade and being movable by said centrifugal force between a full-load and an idling speed position to meter said bore, and an adjustable rotary speed control means for controlling said fuel metering and control means comprising means including a spring means for applying a preselected spring force against said control piston to limit movement thereof in response to said centrifugal force beyond a predetermined metering position corresponding to a selected rotary speed and an equilibrium condition for said means for applying said spring force, said control piston being movable against said spring force to tend to close said metering bore when the centrifugal force acting on said piston exceeds a predetermined limit corresponding to the preselected spring force and adjustable speed selector means adapted for continuous manual control during operation of said installation for providing a control impulse against said means for applying said spring force to adjust said predetermined metering position, said adjustable rotary speed control means adjusting said fuel metering and control means to one of said full-load and idling speed positions upon receipt of the initial control impulse from said speed selector means for such length of time until a return impulse from said speed regulating means in the form of a changed centrifugal force re-establishes the equilibrium condition disturbed by the adjustment in said metering position.

2. An installation according to claim 1, wherein said fuel supply means for supplying fuel to the burners of said drive unit is subdivided into two supply systems, the supply system extending up to said fuel metering means being sealed against the atmosphere and operating predominantly by centrifugal force, and the other supply system extending from behind said fuel metering system to the burners of said drive unit being vented with respect to the atmosphere and supplying the pre-metered fuel quantities exclusively by centrifugal force.

3. An installation for controlling and effectively supplying fuel quantities for rotating ram-jet units including burners arranged at the outer ends of the rotor blades of helicopters, and a relatively stationary engine framework including a rotor housing, means and shifting housing means connected with said rotor housing means, comprising fuel supply means for supplying fuel to the burners of the drive units by the centrifugal force occurring during operation of the drive unit, a fuel-metering and control means arranged in said fuel supply means including a metering bore and a control piston adapted to meter the flow through said bore, said control piston being arranged to rotate in union with the rotor blade and being movable by said centrifugal force to meter said bore, and an adjustable rotary speed control means for controlling said fuel-metering and control means comprising speed-selecting means and means for applying a preselected spring force against said control piston to limit movement thereof in response to said centrifugal force beyond a predetermined metering position corresponding to the selected rotary speed including compression spring means operative as pre-selector spring and means for operatively connecting said spring means and said control piston, said spring means including a spring abutment adjustably arranged in relation to said control piston, said control piston being movable against said spring force to tend to close said metering bore when the centrifugal force acting on said piston exceeds a predetermined limit corresponding to the preselected spring force, and said speed-selecting means including a speed selector lever movably arranged with respect to said framework and provided with a foot portion constructed as ball-shaped rotary bearing supported within said shifting housing means, the inside diameter of said shifting housing means being larger than the height thereof, cover means for said housing means serving simultaneously as abutment for said rotary bearing, and an adjusting bushing provided with a bottom portion and sliding in the axial direction thereof within guide means rigid with the rotor, said adjusting bushing acting on said spring means and being actuated by said foot portion constructed as rotary bearing.

4. An installation according to claim 3, wherein a further bushing is arranged slidably in the axial direction thereof within said adjusting bushing which abuts against said bottom portion and is provided with an abutment for said spring means.

5. An installation according to claim 4, wherein the fuel supply takes place selectively by actuation of said speed selector lever.

6. An installation according to claim 4, further comprising a closure spring arranged within said second mentioned bushing which abuts, on the one hand, against said abutment provided on said further bushing and, on the other, against said bottom portion, said adjusting bushing completely closing off the fuel supply with said selector lever in the stop position thereof in which it assumes an essentially vertical position.

7. An installation according to claim 6, wherein said means for operatively connecting said spring means and said control piston comprises a push rod abutting against said spring abutment, a bell crank, one of the arms of said bell crank being operatively connected with said push rod, a connecting rod operatively connecting the other arm of said bell crank with the fuel control piston of said fuel metering means, said fuel supply means including fuel supply pipe means secured at said rotor housing means and provided with guide bushing means, said fuel control piston sliding within said guide bushing means and including a control edge for controlling therewith the metering bore.

8. An installation according to claim 7, further comprising means for limiting the minimum fuel quantity including an abutment provided at the outer end of said connecting rod which abuts against the inner end of said guide bushing means whereby said fuel control piston closes off most of the metering bore upon abutment by said abutment disk against said guide bushing means to provide effectively a minimum fuel quantity position corresponding to the idling speed position of the drive unit.

9. An installation according to claim 8, further comprising means for limiting the fully opened position of said metering bore including additional abutment means formed by a disk secured in front of said fuel control piston which abuts against a stationary abutment within said fuel supply pipe means.

10. An installation for controlling and effectively supplying fuel quantities for rotating ram-jet units including burners arranged at the outer ends of the rotor blades of helicopters, comprising fuel supply means for supplying fuel to the burners of the drive units by the centrifugal force occurring during operation of the drive unit, a fuel-metering and control means arranged in said fuel supply means including a metering bore and a control piston adapted to meter the flow through said bore, said control piston being arranged to rotate in unison with the rotor blade and being movable by said centrifugal force to meter said bore, and an adjustable rotary speed control means for controlling said fuel-metering and control means comprising speed-selecting means and means for applying a preselected spring force against said control piston to limit movement thereof in response to said centrifugal force beyond a predetermined metering position corresponding to the selected rotary speed including compression spring means operative as pre-selector spring and means for operatively connecting said spring means and said control piston, said spring means including a spring abutment adjustably arranged in relation to said control piston, said control piston being movable against said spring force to tend to close said metering bore when the centrifugal force acting on said piston exceeds a predetermined limit corresponding to the preselected spring force, and said means for operatively connecting said spring means and said control piston comprising a push rod abutting against said spring abutment, a bell crank, one of the arms of said bell crank being operatively connected with said push rod, a connecting rod operatively connecting the other arm of said bell crank with said control piston of said fuel-metering means, and fuel supply pipe means secured at said rotor housing means and provided with guide bushing means, said fuel control piston sliding within said guide bushing means and including a control edge for controlling therewith the metering bore.

11. An installation according to claim 10, further comprising means for limiting the minimum fuel quantity including an abutment provided at the outer end of said connecting rod which abuts against the inner end of said guide bushing means whereby said fuel control piston closes off most of the metering bore upon abutment by said abutment disk against said guide bushing means to provide effectively a minimum fuel quantity position corresponding to the idling speed position of the drive unit.

12. An installation according to claim 11, further comprising means for limiting the fully opened position of said metering bore including additional abutment means formed by a disk secured in front of said fuel control piston which abuts against a stationary abutment within said fuel supply pipe means.

13. An installation according to claim 12, further comprising fuel discharge housing means secured at said fuel supply pipe means behind the fuel metering bore, supply line means leading from said fuel discharge housing means to a feed line leading to the burner of the jet drive unit, a free space being provided between the discharge orifice of said supply line means and the aperture of said feed line.

14. An installation according to claim 13, wherein the hollow rotor blade is vented with respect to the atmosphere by an aperture.

15. An installation according to claim 13, wherein said space is produced by inserting said supply line means into the feed line with an air gap.

16. An installation according to claim 14, wherein said fuel supply pipe means together with said guide bushing means and the fuel metering bore is adjustable in relation to said rotor housing means and said fuel control piston.

References Cited in the file of this patent
UNITED STATES PATENTS

| | | |
|---|---|---|
| 2,594,788 | Morain | Apr. 29, 1952 |
| 2,716,459 | Toney | Aug. 30, 1955 |
| 2,782,861 | Lent | Feb. 26, 1957 |
| 2,943,685 | Sargent | July 5, 1960 |
| 2,965,178 | Peterson | Dec. 20, 1960 |
| 2,991,618 | Marscher | July 11, 1961 |